US005561454A

United States Patent [19]

Kurabayashi et al.

[11] Patent Number: 5,561,454

[45] Date of Patent: Oct. 1, 1996

[54] RECORDING MEDIUM AND INK JET RECORDING METHOD THEREFOR

[75] Inventors: Yutaka Kurabayashi, Yokohama; Mamoru Sakaki, Sagamihara; Hiroshi Sato, Yokohama, all of Japan

[73] Assignee: Canon Kabushiki Kaisha, Tokyo, Japan

[21] Appl. No.: 967,240

[22] Filed: Oct. 27, 1992

[30] Foreign Application Priority Data

Oct. 30, 1991 [JP] Japan .................................... 3-310118

[51] Int. Cl.$^6$ ............................. B41J 2/005; B32B 27/10

[52] U.S. Cl. ........................... 347/105; 347/106; 428/481

[58] Field of Search ......................... 346/135.1; 347/105, 347/106; 428/481

[56] References Cited

U.S. PATENT DOCUMENTS 4,440,827 4/1984 Miyamoto et al. .................. 346/135.1
4,746,646 5/1988 Nakanishi et al. ...................... 503/227
5,171,626 12/1992 Nagamine et al. ..................... 428/212

FOREIGN PATENT DOCUMENTS 54-59936 5/1979 Japan .
56-148585 11/1981 Japan .
59-185690 10/1984 Japan .
60-54915 3/1985 Japan .
61-23097 10/1986 Japan .

*Primary Examiner*—Valerie A. Lund
*Attorney, Agent, or Firm*—Fitzpatrick, Cella, Harper & Scinto

[57] ABSTRACT

A recording medium having at least a pigment and a binder on the surface of a base, wherein the binder is comprised of at least water-soluble polyester. An ink jet recording method includes the step of performing recording on a recording medium by discharging ink from an orifice of an ink jet recording head in accordance with recording signals, wherein the recording medium has at least a pigment and a binder on the surface of a base, and wherein the binder is comprised of at least water-soluble polyester. The amount of the water-soluble polyester is 40% or more with respect to the total weight of the binder.

35 Claims, 3 Drawing Sheets

RECORDING MEDIUM AND INK JET RECORDING METHOD THEREFOR

BACKGROUND OF THE INVENTION

1. Field of the Invention

The present invention relates to a recording medium having excellent ink absorbability and color development properties, by which high-quality color recording images having excellent optical densities and sharpness can be formed, and by which such images can be stably stored, and to an ink jet recording method therefor.

2. Description of the Related Art

Hitherto, the following types of mediums have been known as recording mediums for ink jets: (1) those in which an ink absorbing layer is provided on a medium having a low ink absorbability, such as commonly-used fine-grade paper, by using porous inorganic pigments, as disclosed in Japanese Patent Laid-Open No. 56-148585, and (2) those in which a porous pigment layer is provided on an absorbent medium (paper made so that sizing degree is decreased), as disclosed in Japanese Patent Laid-Open No. 59-185690.

It is required that a commonly-used ink jet recording medium have the following properties: the capability of forming images having high optical densities and chroma, a dye having excellent color development properties, and the capability to stably store recorded images. It is also required that the performance thereof not deteriorate when such recording mediums are stored for a fixed period of time under stringent conditions requiring that both temperature and humidity be high.

SUMMARY OF THE INVENTION

It is an object of the present invention to provide a recording medium by which high-quality images can be printed even if it is stored under adverse conditions, namely, high temperature and high humidity, and an ink jet recording method therefor.

To this end, according to one aspect of the present invention, there is provided an recording medium having at least a pigment and a binder on the surface of a base, wherein the binder is comprised of at least water-soluble polyester.

According to another aspect of the present invention, there is provided an ink jet recording method, comprising the step of performing recording on a recording medium by discharging ink from an orifice of an ink jet recording head in accordance with recording signals, wherein the recording medium has at least a pigment and a binder on the surface of a base, and the binder is comprised of at least water-soluble polyester.

Other objectives, features, and advantages in addition to those discussed above will become more apparent from the following detailed description of the preferred embodiments taken in conjunction with the accompanying drawings.

DESCRIPTION OF THE PREFERRED EMBODIMENTS

Figure 1:
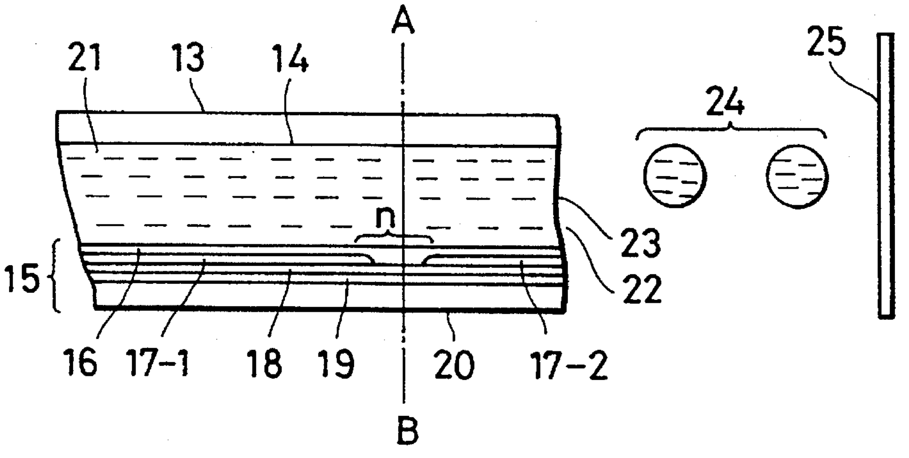
FIG. 1 is a longitudinal sectional view of a head section of an ink jet recording apparatus.

Examples which have been commonly used hitherto as a binder for forming an ink receiving layer of an ink jet recording medium are: a water dispersion type high polymer, such as polyvinyl acetate emulsion or SBR latex, and a water-soluble high polymer, such as polyvinyl alcohol, starch, oxidized starch, or gelatin. However, the recording medium prepared with the aforesaid binder being used for forming an ink receiving layer has a problem in that, if ink jet recording is performed after the recording medium has been stored for a long period of time in a high temperature, high humidity environment, the printing quality of the image deteriorates, that is, for example, the density of the image decreases, oozing of the ink increases, or fixability of the ink decreases, mainly because the ink absorption characteristics of the binder deteriorates.

However, as proposed in the present invention, recording characteristics, in particular, ink jet recording characteristics, do not deteriorate after the ink jet recording medium is stored due to the fact that the use of water-soluble polyester as a binder or as a part of the binder together with a pigment in the ink jet recording medium causes the ink absorbability of the recording medium not to decrease even if it is stored for a long period of time in a high temperature, high humidity environment. The advantage of the water-soluble polyester described above is particularly signficant when basic magnesium carbonates are used as pigments.

Next, the present invention will be explained in more detail with reference to preferred embodiments.

The recording medium of the present invention is formed of a base and a surface layer formed of a pigment and a binder provided on the base. Paper, plastics and the like may be used as a base.

Preferred embodiments of the present invention using paper as a base will be explained below.

A water-soluble polyester which can be used in the present invention is either anionic water-soluble polyester in which a carboxyl group of a polyester resin or sulfonic acid is neutralized with a basic neutralizer, or nonionic water-soluble polyester formed with a large amount of hydroxyl group or ether group. These polyester raw materials can be used without any specific limitations. A non-inclusive list of polybasic acids and polyhydric alcohols which can be used as raw materials is given below, but it is not exhaustive.

Examples of polybasic acid are: phthalic anhydride, isophthalic acid, terephthalic acid, tetrahydrophthalic anhydride, hexhydrophthalic anhydride, hymic anhydride, maleic anhydride, fumaric acid, adipic acid, azelaic acid, sebacic acid, itaconic acid, trimellitic anhydride, pyromellitic anhydride, and derivatives of these.

Examples of polyhydric alcohols are: ethylene glycol, propylene glycol, 1,3-butylene glycol, 1,6-hexanediol, diethylene glycol, dipropylene glycol, neopentyl glycol, glyceline, trimethylol ethane, trimethylol propane, pentaerythritol, and dipentaerythritol.

Neutralizers usable for obtaining anionic water-soluble polyester can be used without any specific limitations.

However, when they are selected, attention should be given to the stability and fluid characteristics of the resin, dispersability and solubilization of the pigment, and the like. Examples of neutralizers include: ammonia, triethanolamine, diethyleneamine, 2-amino-2-methyl-1-propanol, N,N-dimethyl-ethanolamine, N,N-dimethylethanolamine, 2-diethylamino-2-methyl-1-propanol, monoisopropanolamine, diisopropanolamine, triethylamine, monoethanolamine, N-ether-diethanolamine, and N-methyldiethanolamine. However, they are not exhaustive.

Methods for producing nonionic water-soluble polyester resins include crosslinking using PVA, phenol resins, methylolmelamine, urea resins or the like, and a method of adding bisphenol A to ethylene oxide.

In the present invention, the water-soluble polyester described above is used together with pigments and other additives. The molecular weight of the water-soluble polyester is preferably from 500 to 500,000.

There is no particular limitation on the types of base paper which can be used in the present invention. A common fine-grade paper, or absorbent base paper may be used. The absorbability indicates a capability of absorbing ink of a fixed amount, e.g., (10 μl/m$^2$). Specifically, in the present invention, absorbability is the amount of the liquid transferred when the absorption time is 80 msec. when a test method similar to the Bristol method described in the J.TAPPI paper pulp test method is used wherein 80 μl/m$^2$ of ink is added to a head box. Such absorbent base paper can be manufactured by using an additive, such as clay, talc, or calcium carbonate, a paper-making assisting agent, a sizing agent, a yield improver, or a paper strengthening agent as required, with conventional well-known wood pulp being used as a main constituent.

Pigments which can be used in the present invention are well known. Examples thereof include: silica, clay, talc, kaoline, calcium carbonate, basic magnesium carbonate, alumina, zinc oxide, magnesium oxide, aluminum silicate, magnesium silicate, diatomaceous earth, and hydrosulfite. Among the aforesaid pigments, alumina, magnesium silicate, basic magnesium carbonate, hydrosulfite are preferably used as pigments for carrying out the present invention effectively.

In particular, basic magnesium carbonate is preferred to improve storage stability of the recording image.

In the present invention, wherein the binder is comprised of a water-soluble polyester resin, if a large amount of ink is received by the ink receiving layer, the recording surface may become soft and tacky. In this case, if the resin is used in a recording apparatus in which a paper ejection roller or the like thereof directly contacts the recording surface after recording, the following problems may occur: the recording section may adhere to the paper ejection roller, causing paper jamming, or the surface of the recording section may be peeled off from the base, thus deteriorating the image.

Among the aforesaid pigments, synthetic silica can effectively be used to solve these problems. The content of synthetic silica should preferably be 2 wt % of all pigments which form the ink receiving layer, and more preferably 10 wt % of all pigments which form the recording surface at the surface of the ink receiving layer. Most preferably, the content of synthetic silica should be 30 wt % of all pigments. When the amount of synthetic silica is in the above-mentioned range, storage stability of recording images is satisfactory, and the recording section does not become tacky.

The preferable ratio by weight of a pigment (P) to a binder (B) used in the present invention is in a range of about 10:1 to about 1:4, and preferably about 6:1 to about 1:1. A well-known binder of the prior art may also be used with the above-mentioned water-soluble polyester. In order not to impair the benefits of the present invention, the wt % range of water-soluble polyester must be 25 wt % or more of all binders, and preferably 60 wt % or more thereof.

When forming recording mediums of the present invention, a water-based coating solution containing such a pigment or binder as that described above, or other additives which will be described later, is applied to the surface of a support member by a well-known method, for example, a roll coater method, a blade coater method, an air-knife coater method, a gate-roll coater method, or a size-press coater method. Thereafter, it is dried by using a hot-air drying furnace, a heat drum or the like, and thus the recording medium of the present invention is formed. Furthermore, a super calendar operation may be performed to smooth the surface of the recording medium or to increase the strength thereof.

The recording medium of the present invention may be formed as an ink receiving layer by applying the above-mentioned coating solution onto commonly used fine-grade paper, or the ink receiving layer may be formed in multi-layers. The preferable range of the amount of coating of the recording medium constructed as described above, in terms of solid matter weight after being dried, is from 0.5 to 40 g/m$^2$ and preferably from 5 to 30 g/m$^2$ when the ink receiving layer is a single layer. When the ink receiving layer is multi-layered, the total amount of coating of all the ink receiving layers should be from 5 to 50 g/m$^2$ and preferably from 10 to 40 g/m$^2$. The benefits intended by the present invention are not significantly diminished even if the water-soluble polyester is formed only in an upper layer or only in a lower layer.

Another structure of the recording medium of the present invention is formed when the above-mentioned coating solution is applied onto the absorbent base paper described above. A preferable range of the amount of coating is from 0.5 to 20 g/m$^2$. The surface of this recording medium may not necessarily completely cover the surface of the support member with a pigment, and some fibers on the surface of the support member may be exposed. The effect of the present invention is not diminished even if the recording medium is constructed as described above. It is assumed that the amount of coating mentioned in the present invention is calculated by excluding the amount of ash of the base paper from the ash amount described in JIS P-8128.

When the recording medium of the present invention is formed, an agent, such as a dye fixing agent (a hydration resistant agent), a fluorescent whitening agent, a surfactant, a defoaming agent, a pH adjustor, an antifungal substance, an ultraviolet-ray absorber, an oxidation inhibitor, a dispersing agent, or a coking reducing agent, may be contained in the coating. Depending upon the intended purpose, these agents may be selected from compounds which have been known hitherto.

A well-known ink may be used for recording on the recording medium. The recording agent thereof is formed by dissolving and decomposing water-soluble dye or the like typified by direct dye, acid dye, basic dye, reactive dye, food dye, or the like, in an appropriate solvent. Generally, approximately 0.1 to 20 wt % of water-soluble dye is used in conventional ink, and the same wt % applies to the present invention.

Water or a mixture of water and a water-soluble organic solvent is the solvent used in water-based ink in the present invention. Preferably, a mixture of water and a water-soluble organic solvent should be used, and deionized water as a water-soluble solvent instead of ordinary water, which has an ink drying prevention effect. The amount of a water-soluble solvent contained in ink should generally be 0 to 95 wt % with respect to the total weight of the ink, preferably 2 to 80 wt %, and more preferably 5 to 50 wt %. The ink used for recording may contain, in addition to the above-mentioned components, a surfactant, a viscosity adjustor, a surface tension adjustor, or the like.

The ink of the present invention is preferably used in an ink jet recording method in which recording is performed by discharging liquid droplets by means of the application of heat energy. However, it may also be used for common writing instruments.

In the ink jet recording method of the present invention, a recording medium described above and water-based inks described above are used. For example, water-based two-color inks selected from three colors of yellow, magenta and cyan, or from four colors of the above three colors and black, may be-used. These inks are applied to the recording medium (a target member) to form an image by effectively discharging the inks from a nozzle. In this method, any well-known ink jet system may be used.

A preferable method is one disclosed in Japanese Patent Laid-Open No. 54-59926, where ink which has been subjected to the application of heat energy undergoes rapid volume changes. An applicaion force produced by this volume change discharges the ink from the nozzle, and a high-quality color image is formed on the recording medium.

An example of a method and apparatus for recording using the ink of the present invention is one in which heat energy corresponding to recording signals is supplied to the ink inside the recording head, causing liquid droplets to be generated.

Figure 2:
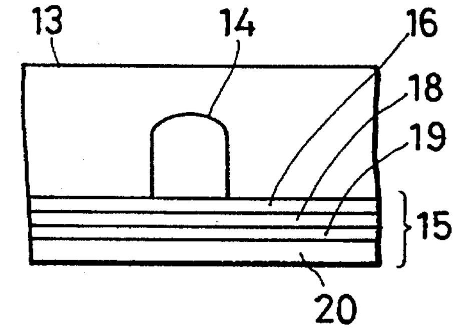
FIG. 2 is a transverse sectional view of the head section of the ink jet recording apparatus.
Figure 3:
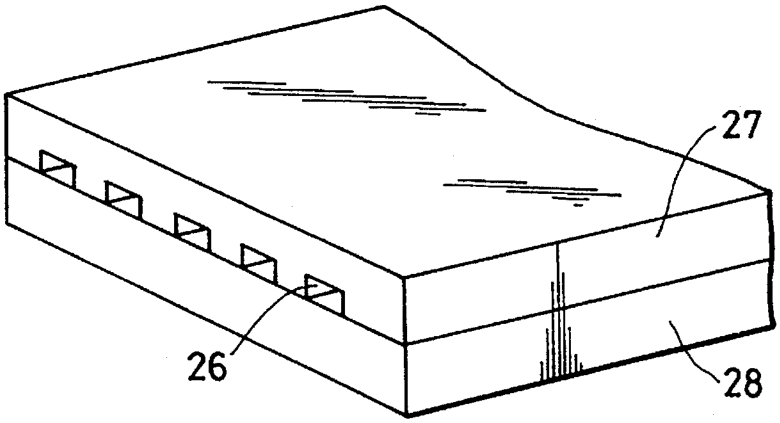
FIG. 3 is a perspective view of the exterior of the multi-faceted head shown in FIG. 1.

An example of the construction of the head which is a main section of the apparatus is shown in FIGS. 1, 2 and 3.

A head 13 is produced by bonding a glass plate, ceramic plate, plastic plate, or the like, having a groove 14, to a heat generation head 15 (not limited by the head shown in the figure) used for thermosensitive recording. The heat generation head 15 comprises a protective film 16 formed from silicon oxide or the like, aluminum electrodes 17-1 and 17-2, a heat-generation resistant layer 18 formed from nichrome or the like, a heat storing layer 19, and a board 20 formed from alumina or the like having high heat-dissipating properties.

Ink 21 reaches a discharge orifice (a fine hole) 22 and forms a meniscus 23 by pressure P.

When an electrical signal is applied to the electrodes 17-1 and 17-2, heat is rapidly generated in the region indicated by "n" of the heat generation head 15, air bubbles occur in the ink 21 in contact with that region, the meniscus 23 projects by the pressure produced by the air bubbles, the ink 21 is discharged and becomes recording droplets 24 from the orifice 22, and are jetted onto a member 25 to be recorded.

FIG. 3 shows the exterior of a multi-faceted head in which a great number of heads shown in FIG. 1 are arranged.

The multi-faceted head is formed in such a manner that the glass plate 27 having a multi-groove 26 is in close contact with the heat-generation head 28, similarly to that described in FIG. 1. FIG. 1 is a sectional view of the head 13 along an ink passage. FIG. 2 is a sectional view taken along a line A-B of FIG. 1.

Figure 4:
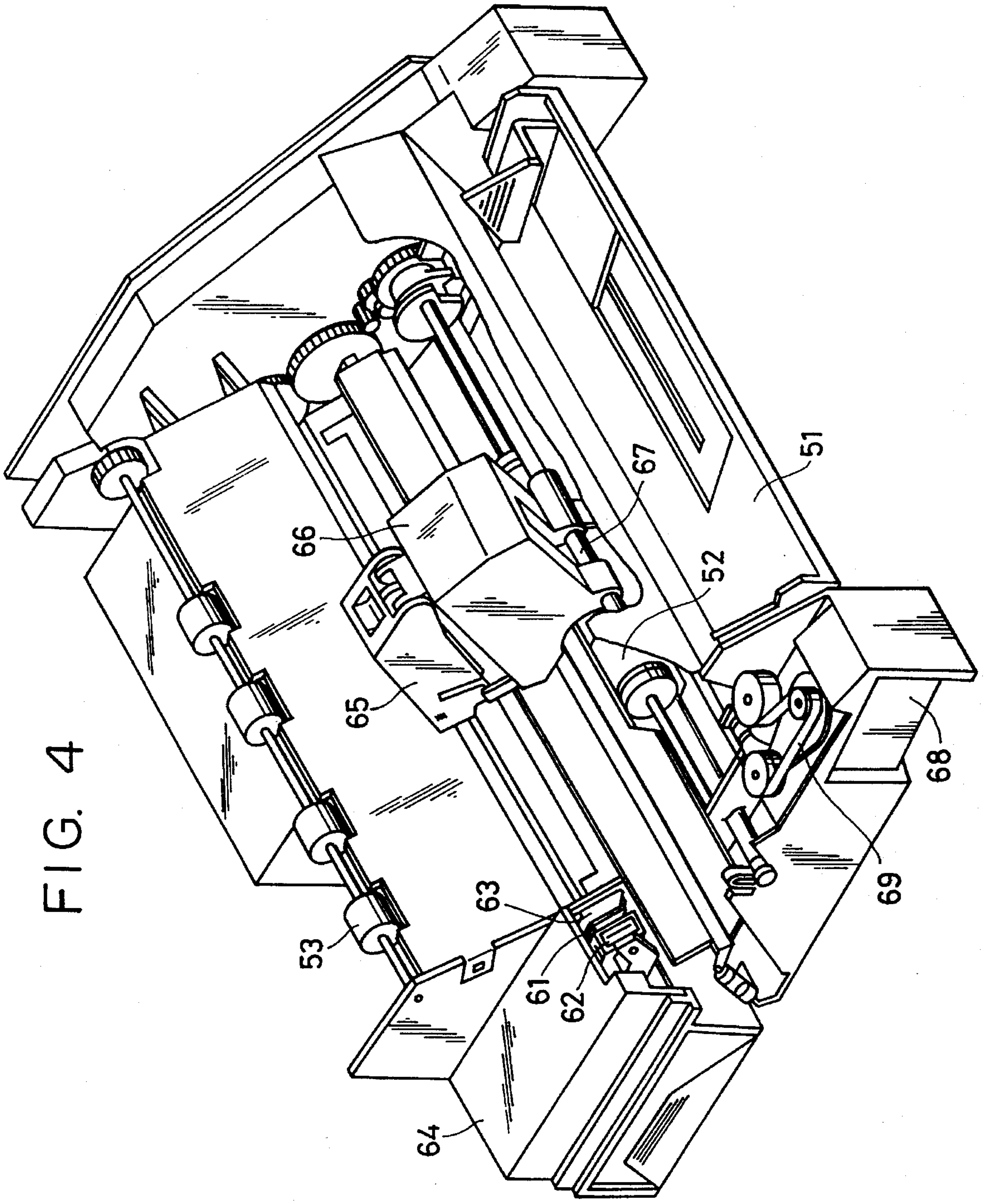
FIG. 4 is a perspective view illustrating an example of the ink jet recording apparatus.

FIG. 4 illustrates an example of an ink jet recording apparatus into which such a head is incorporated.

In FIG. 4, reference numeral 61 denotes a blade serving as a wiping member, one end of which is held by a blade holding member, becoming a fixed end, and forming a cantilever. The blade 61 is disposed at a position adjacent to an area to be recorded by a recording head. In this example, the blade 61 is held in a state in which it projects into the passage in which the recording head is moved. Reference numeral 62 denotes a cap which is disposed at a home position adjacent to the blade 61. It is moved perpendicularly to the movement of the recording head and abuts the surface of the outlet thereof comprising an arrangement for capping. Reference numeral 63 denotes an ink absorber provided adjacent to the blade 61 and held in a state similar to that in the blade 61, that is, in which it projects into the passage where the recording head moves. The blade 61, the cap 62 and the ink absorber 63 constitute a discharge recovery section 64. Water, dust or the like on the ink outlet surface are removed by the blade 61 and the ink absorber 63.

Reference numeral 65 denotes a recording head having discharge energy generation means by which recording is performed in such a way that ink is discharged to a member to be recorded which faces the outlet surface. Reference numeral 66 denotes a carriage on which the recording head 65 is carried and by which it is moved. The carriage 66 is slidably engaged with a guide shaft 67, and a part of the carriage 66 is connected to a belt 69 (not shown) driven by a motor 68. This makes it possible for the carriage 66 to move along the guide shaft 67, and in the area to be recorded by the recording head 65 and in areas adjacent thereto.

Reference numeral 51 denotes a paper feed section to which members to be recorded are inserted, and reference numeral 52 denotes a paper feed roller driven by an unillustrated roller. With this arrangement, a member to be recorded is fed to a position facing the outlet surface of the recording head, and fed, as the recording progresses, to a paper ejection section in which a paper ejection roller 53 is placed.

In the arrangement described above, when the recording head 65 returns to the home position because the recording is terminated or for any other reason, the cap 62 of the head recovery section 64 retracts from the passage in which the recording head 65 moves, but the blade 61 projects into the passage. As a result, the outlet surface of the recording head 65 is wiped. When capping is performed in such a way that the cap 62 abuts the discharge surface of the recording head 65, it projects into the passage in which the recording head moves.

When the recording head 65 moves from its home position to the position where recording starts, the cap 62 and the blade 61 are at the same positions as during the above-mentioned wiping. As a result, the discharge surface of the recording head 65 is also wiped during this movement thereof.

When the recording is terminated or the discharge is recovered, the recording head not only moves to its home position, as described above, but also to the home position adjacent to the recording area at predetermined intervals while the recording head moves in the recording area for recording. The above-mentioned wiping is performed with this movement.

Figure 5:
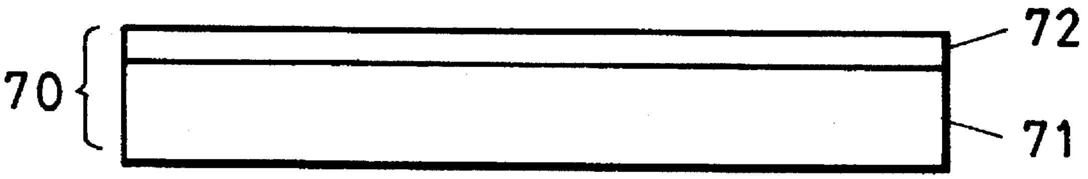
FIG. 5 is a sectional view of a recording medium of this invention.
Figure 6:
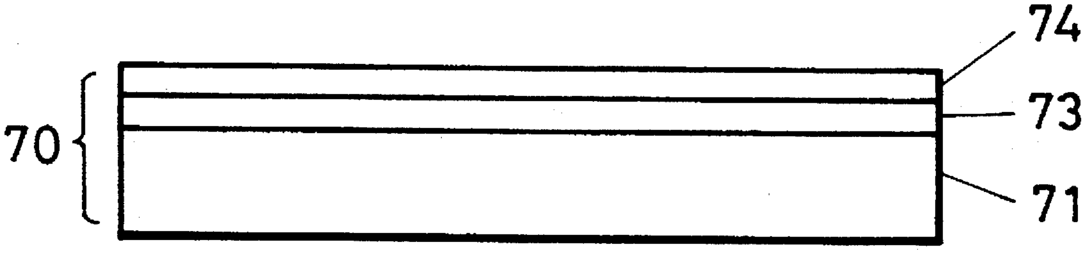
FIG. 6 is a sectional view of another embodiment of a recording medium of this invention.

FIGS. 5 and 6 represent two embodiments of the recording medium of this invention. FIG. 5 shows a recording medium 70 having a base 71 and a surface layer 72 disposed thereon. The surface layer 72 is comprised of a pigment and a binder, wherein the binder is comprised of at least water-soluble polyester. In another embodiment of this invention (not shown), the surface layer need not fully cover the surface of the base so that some fibers of the base may be exposed above the surface layer.

FIG. 6 illustrates another embodiment of the recording medium 70 of this invention having a lower ink receiving layer 73 and an upper ink receiving layer 74 sequentially disposed on a base 71. At least one of either the lower lower ink receiving layer 73 or the upper ink receiving layer 74 is comprised of at least a water-soluble polyester as a binder, although both layers may contain water-soluble polyesters.

EXAMPLES

Next, the present invention will be explained in more detail by reference to the following examples and comparative examples. Parts or % in the description are given on a weight basis unless otherwise specified. Reference Example (Preparation of recording mediums)

Fine-grade paper of the trade name of "Shiorai" (made by Daishowa Paper Mfg. Co., Ltd.) weighing 16 g/m$^2$ and with thickness of 180 μm was prepared as a base.

The base was coated with a coating material having the composition shown below by a bar coater method so that the coating was formed to 20 g/m$^2$, and dried for 5 minutes at 110° C. Thereafter, a super calendar operation was performed by a conventional procedure. Thus, recording mediums of examples 1 to 4 of the present invention and comparative examples 1 to 3 were obtained.

| (Preparation of recording mediums) | |
|---|---|
| Pigment | 100 parts |
| Binder | 30 parts |
| Hyration resistant agent (made by Nitto Boseki Co., Ltd., polyallylamine hydrochloride, PAA-HCL-10L) (conversion into solid matter) | 30 parts |
| Water | 1,000 parts |

The pigments and binders listed in Table 1 shown below were used.

TABLE 1

| | Pigments and Binders | |
|---|---|---|
| | Pigments | Binders |
| Example 1 | Silica (Thyroid 620, manufactured by Fuji Davison Chemical Co., Ltd., average particle size: 12.0 μm, BET specific surface area: 300 m$^2$/g) | Water-soluble polyester (FR-550, manufactured by Goou Chemical Industries, Co., Ltd., nonionic type, pH 5 to 7) |
| Example 2 | Basic magnesium carbonate (AM-50, manufactured by Asahi Glass Co., Ltd., average particle size: 9.0 μm, BET specific surface area: 32 m$^2$/g) | Water-soluble polyester (Z-767, manufactured by Goou Chemical Industries, Co., Ltd., anionic type, pH 5 to 7) |
| Example 3 | Hydrotalcite (BHT-4A-2, manufactured by Kyowa Chemical Co., Ltd., average particle size < 1.0 μm, BET specific surface area: 18 m$^2$/g) | Water-soluble polyester (Z-448, manufactured by Goou Chemical Industries, Co., Ltd., anionic type, pH 5.5 to 6.5, molecular weight: 15,000 to 20,000) |
| Example 4 | Magnesium silicate (AD-600, manufactured by Tomita Pharmaceutical Co., Ltd., average particle size: 5.0 μm, BET specific surface area: 400 m$^2$/g) | Water-soluble polyester (Z-446, manufactured by Goou Chemical Industries, Co., Ltd., anionic type, pH 5 to 6, molecular weight: 15,000 to 20,000) |
| Comparative Example 1 | Same as in Example 1 | Polyvinyl alcohol (PVA-117, manufactured by Kuraray Co., Ltd. saponification: 98%, polymerization: 1,700) |
| Comparative Example 2 | Same as in Example 2 | Same as in comparative example 1 |
| Comparative Example 3 | Same as in Example 3 | Same as in comparative example 1 |

The water-soluble polyester Z-446 in the above Table 1 has monomer compositions of 29 mole % of terephthalic acid, mole % of isophthalic acid, 6 mole % of 3-sulfonic acid sodium isophthalic acid, and 50 mole % of ethylene glycol.

The water-soluble polyester Z-448 has monomer compositions of 31 mole % of terephthalic acid, 16 mole % of isophthalic acid, 3 mole % of 3-sulfonic acid sodium isophthalic acid, and 50 mole % of ethylene glycol.

The plus coat Z-767 has monomer compositions of 50 mole % of trimellitic acid and 50 mole % of ethylene glycol. The plus coat FR-550 has monomer compositions of 50 mole % of terephthalic acid and 50 mole % of HO—$(CH_2)_n$—OH (n=3 to 50).

A recording medium of Example 5 of the present invention was formed as follows by using the above-mentioned fine-grade paper "Shiorai" serving as a base and two coating materials for an upper layer and a lower layer described below.

| (Composition of coating materials of the upper layer) | |
|---|---|
| Pigment (alumina AKP-G, manufactured by Sumitomo Chemical Co., Ltd., average particle size: 0.5 μm, BET specific surface area: 140 m$^2$/g) | 100 parts |
| Binder (polyvinyl alcohol, PVA-217, manufactured by Kuraray Co., Ltd.) | 20 parts |
| Hydration resistant agent (polyamine sulfone, PAS-A-120L, manufactured by Nitto Boseki Co., Ltd., molecular weight: 100,000) (conversion into solid matter) | 30 parts |
| **(Composition of coating materials of the lower layer)** | |
| Pigment (spherical basic magnesium carbonate, average particle size: 3.5 μm, BET specific surface area: 40 m$^2$/g, refer to Japanese Patent Laid-Open No. 60-54915) | 100 parts |
| Binder (anionic polyester, plus coat Z-446, manufactured by Goou Chemical Industries, Co., Ltd.) | 15 parts |
| Binder (polyvinyl alcohol PVA-117, manufactured by Kuraray Co., Ltd., saponification: 89%, polymerization: 1,700) | 15 parts |
| Fluorescent whitening aaent (Kaycol-BXNL, Nippon Soda, Co., Ltd.) (conversion into solid matter) | 0.3 parts |

First, a coating material of the lower layer was applied by a bar coater method and dried for 5 minutes at 110° C. Thereafter, a coating material of the upper layer was applied also by the bar coater method and dried for 5 minutes at 110° C. Then, a super calendar operation was performed by a conventional procedure. The amounts of coating of the upper and lower layers were 20 g/m$^2$ and 10 g/m$^2$, respectively.

In addition, the recording mediums of Examples 6 to 9 of the present invention and Comparative Example 4, were formed on a base material weighing 95 g/m$^2$ having a thickness of 110 μm, an ink absorbing capacity of 20 ml/m$^2$ by the Bristol method, 7.0% of a filling material, and calcium carbonate in terms of conversion to an amount of ash according to JIS-P-8128.

Such a base was coated by the bar coater method using a coating material having the composition described below, and dried for 5 minutes at 110° C. Thereafter, a super calendar operation was performed by a conventional procedure. The amount of coating was adjusted to 5 g/m$^2$.

The composition of each of the binders used in Example 6 to 9 and Comparative Example 4 is shown in Table 2.

| | |
|---|---|
| Pigment (spherical basic magnesium carbonate, average particle size: 5.0 μm, BET specific surface area: 35 m$^2$/g, refer to Japanese Patent Laid-Open No. 60-54915) | 100 parts |
| Binder | 30 parts |
| Hydration resistant agent (polyallylamine hydrochloride, PAA-HCL-10L, manufactured by Nitto Boseki Co., Ltd., molecular weight: 100,000) (conversion into solid matter) | 10 parts |
| Water | 1,000 parts |

TABLE 2

| | Binders | Content |
|---|---|---|
| Example 6 | Anionic polyester (Z-446) | 12 parts |
| | Polvvinyl alcohol, PVA-117 | 18 parts |
| Example 7 | Anionic polyester (Z-446) | 18 parts |
| | Polyvinyl alcohol, PVA-117 | 12 parts |
| Example 8 | Anionic polyester (Z-446) | 24 parts |
| | Polyvinyl alcohol, PVA-117 | 6 parts |
| Example 9 | Anionic polyester (Z-446) | 30 parts |
| Comparative Example 4 | Polyvinyl alcohol, PVA-117 | 30 parts |

The applicability of the ink jet recording for recording mediums of the present invention and comparative examples described above was evaluated by performing ink jet recording by using ink having the composition described below with an ink jet printer having 128 nozzles at a rate of 16 nozzles/mm and whose head is divided for four colors of Y, M, C, and Bk, to which printer an ink jet recording method in which ink droplets are discharged by heat energy was applied.

| (Ink composition) | |
|---|---|
| Dye | 4 parts |
| Diethylene glycol | 30 parts |
| Water | 66 parts |

Dyes used for each ink:

Y: C. I. direct yellow 86

M: C. I. acid red 35

C: C. I. direct blue 199

Bk: C. I. food black 2

Evaluation was made on the basis of the criteria described below as regards the following items. The results of the evaluation are shown in Table 3.

(1) Image density

The image density of black (Bk) of a printed matter which was printed over the entire surface by using the above-mentioned printer was evaluated with a Macbeth densitometer RD-918.

(2) Storing capacity

After each recording medium was stored for 7 days in an environment of 35° C. and 90% RH, it was stored for one day in an environment of 23° C. and 55% RH. Thereafter, evaluation was made on the basis of the criteria described below by using the above-mentioned printer in an environment of 23° C. and 55% RH.

O: no change, such as overflow and oozing of ink, or characters becoming thick, was observed when compared with the recording medium before being stored Δ: changes are intermediate x : overflow and oozing of ink occurred, characters became thick, the image quality poorer than in the recording medium before being stored xx: in addition to a decrease in the ink absorbability, the image density was lower.

TABLE 3

| | Results of Evaluation | | | | | | | | |
|---|---|---|---|---|---|---|---|---|---|
| | Before stored | | | | After stored | | | | Absorbability |
| | Bk | Y | M | C | Bk | Y | M | C | |
| Example | | | | | | | | | |
| 1 | 1.50 | 1.44 | 1.52 | 1.48 | 1.50 | 1.43 | 1.50 | 1.48 | o |
| 2 | 1.35 | 1.30 | 1.40 | 1.40 | 1.34 | 1.30 | 1.40 | 1.40 | o |
| 3 | 1.40 | 1.32 | 1.43 | 1.42 | 1.38 | 1.31 | 1.43 | 1.40 | o |
| 4 | 1.35 | 1.29 | 1.41 | 1.41 | 1.33 | 1.28 | 1.40 | 1.40 | o |
| 5 | 1.45 | 1.40 | 1.45 | 1.50 | 1.45 | 1.39 | 1.46 | 1.48 | o |
| 6 | 1.40 | 1.35 | 1.45 | 1.50 | 1.39 | 1.35 | 1.46 | 1.48 | o |
| 7 | 1.38 | 1.34 | 1.43 | 1.48 | 1.37 | 1.33 | 1.42 | 1.46 | o |
| 8 | 1.37 | 1.34 | 1.42 | 1.47 | 1.37 | 1.33 | 1.41 | 1.47 | o |
| 9 | 1.35 | 1.36 | 1.41 | 1.47 | 1.35 | 1.36 | 1.41 | 1.46 | o |
| Comparative Example | | | | | | | | | |
| 1 | 1.56 | 1.44 | 1.54 | 1.47 | 1.52 | 1.40 | 1.50 | 1.42 | X |
| 2 | 1.37 | 1.35 | 1.43 | 1.42 | 1.23 | 1.30 | 1.34 | 1.28 | XX |
| 3 | 1.41 | 1.36 | 1.45 | 1.43 | 1.25 | 1.28 | 1.38 | 1.30 | XX |
| 4 | 1.40 | 1.38 | 1.46 | 1.50 | 1.25 | 1.30 | 1.38 | 1.40 | XX |

EXAMPLE 10 to 12

The recording medium of the present invention was adjusted in the same way as in Example 5 except that pigments in the coating material compositions of the upper layer in Example 5 were replaced as follows:

| | Alumina (AKP-G) (parts) | Synthetic Silica* (parts) | Percentage of silica in all pigments |
|---|---|---|---|
| Example 10 | 90 | 10 | 3 |
| Example 11 | 80 | 20 | 7 |
| Example 12 | 50 | 50 | 17 |

-continued

| Alumina (AKP-G) (parts) | Synthetic Silica* (parts) | Percentage of silica in all pigments |
|---|---|---|

*Synthetic silica (trade name: thyroid 404, manufactured by Fuji Davison Chemical, Co., Ltd., average particle size: 5 μm, BET specific surface area: 300 $m^2/g$) was used.

The items of (1) image density and (2) storage stability of the recording mediums of Examples 10 to 12 were evaluated according to the same method as that used in Example 5.

(1) The image densities of all recording mediums described above were comparable to that of Example 5.

(2) No decrease in the ink abnormality and image density occurred in the recording mediums of Examples 10 to 12, and the storage stability thereof was satisfactory, being comparable to that of Example 5.

Furthermore, the recording medium was evaluated as regards the following items to explain a preferred mode of the present invention.

(3) Image peel-off

Solid printing of red (mixed color of Y and M), green (mixed color of Y and C), and blue (mixed color of C and was performed by using the above-mentioned printer under the environmental conditions of 30° C. and 80% RH. Ink droplets of an amount two times greater the amount required for a usual printing of primary colors of Bk, C, M and Y were supplied to each printing section.

It was then determined with the naked eye whether a defect, such as peel-off of the printing section, occurred in the portion where the paper ejection roller directly contacts the recording surface of the image after a paper was ejected via the paper ejection roller. When a defect was observed, an O was indicated; when no defect was observed, an x was indicated.

(4) Image storage stability

A solid printed matter of Bk was formed in the same manner as was formed in the evaluation of the image density. This matter was then pasted on the outer north side wall of the office where this experiment was conducted and left as it was for one month. The difference (ΔE*) between chromaticities of the printed matter before and after it was left as it was, was determined by using a color analyzer CA-35 (manufactured by Murakami Color Scientific Laboratory), and the image storage stability was evaluated.

The above results are summarized in the table below.

| | (3) Image peel-off | (4) Image storage stability (ΔE*) |
|---|---|---|
| Example 10 | o | 8 |
| Example 11 | o | 10 |
| Example 12 | o | 12 |

As described above, in the case of the present invention which uses a water-soluble polyester resin, although storage stability was excellent, there was a tendency for the printed portion to be tacky, and the printed surface rubbed by the paper ejection roller may be peeled off from the base of the recording medium under high temperature and high humidity conditions, thus damaging the image.

However, this problem can be solved by using synthetic silica as a pigment. As shown in Examples 10 to 12, the recording medium in a preferred mode of the present invention having basic magnesium carbonate and synthetic silica is satisfactory as regards storage stability of the recording medium, image peel-off, and image storage stability. In any environment, products can be produced stably, recording can be performed stably, and recorded matter can be stored stably.

As described above, a recording medium of the present invention having a stable quality can be offered since the initial recording characteristics thereof do not change even if it is exposed to a high temperature and high humidity environment.

Many different embodiments of the present invention may be constructed without departing from the spirit and scope of the present invention. It should be understood that the present invention is not limited to the specific examples described in this specification. To the contrary, the present invention is intended to cover various modifications and equivalent arrangements included within the spirit and scope of the claims. The following claims are to be accorded a broad interpretation, so as to encompass all such modifications and equivalent structures and functions.

What is claimed is:

1. A recording medium comprising an ink receiving layer on a surface of a base, the ink receiving layer comprising at least one pigment and at least one binder, wherein at least one of said binder is a water-soluble polyester, and an amount of the water-soluble polyester is 40 wt % or more with respect to the total weight of said binder.

2. A recording medium according to claim 1, wherein the water-soluble polyester is selected from the group consisting of an anionic water-soluble polyester, a nonionic water-soluble polyester, and mixtures thereof.

3. A recording medium according to claim 1, wherein the ratio of said pigment to said binder is from about 10:1 to about 1:4.

4. A recording medium according to claim 1, wherein the molecular weight of said water-soluble polyester is from 500 to 500,000.

5. A recording medium according to claim 1, wherein said base is absorbent base paper.

6. A recording medium according to claim 1, wherein the pigment contains basic magnesium carbonate.

7. A recording medium according to claim 6, wherein the basic magnesium carbonate is spherical.

8. A recording medium according to claim 1, wherein said pigment contains silica.

9. A recording medium according to claim 1, wherein said pigment contains hydrotalcite.

10. A recording medium according to claim 1, wherein said pigment contains magnesium silicate.

11. A recording medium according to claim 1, wherein said pigment is comprised of basic magnesium carbonate and synthetic silica.

12. A recording medium according to claim 11, wherein an amount of synthetic silica is from 2 wt % to 30 wt % of said pigment.

13. A recording medium comprising a lower ink receiving layer disposed on a surface of base and an upper ink receiving layer disposed on said lower ink receiving layer, at least one of said upper and lower ink receiving layers comprising at least one pigment and at least one binder, wherein at least one of said binder is a water-soluble polyester, and an amount of the water-soluble polyester is 40 wt % or more with respect to the total weight of said binder.

14. A recording medium according to claim 13, wherein said water-soluble polyester is selected from the group consisting of an anionic water-soluble polyester, a nonionic water-soluble polyester, and mixtures thereof.

15. A recording medium according to claim 13, wherein the ratio of said pigment to said binder is from about 10:1 to about 1:4.

16. A recording medium according to claim 13, wherein the molecular weight of said water-soluble polyester is from 500 to 500,000.

17. A recording medium according to claim 13, wherein the pigment contains basic magnesium carbonate.

18. A recording medium according to claim 17, wherein the basic magnesium carbonate is spherical.

19. An ink-jet printing method comprising the steps of:

providing a recording medium comprising an ink receiving layer on a surface of a base, the ink receiving layer comprising at least one pigment and at least one binder, wherein at least one of said binder is a water-soluble polyester, and an amount of the water-soluble polyester is 40 wt % or more with respect to the total weight of said binder; and performing printing on the recording medium by discharging ink droplets from an orifice of an ink jet recording head in accordance with recording signals.

20. An ink jet printing method according to claim 19, wherein ink is discharged by heat energy.

21. An ink jet printing method according to claim 19, wherein the water-soluble polyester is selected from the group consisting of an anionic water-soluble polyester, a nonionic water-soluble polyester, and mixtures thereof.

22. An ink jet printing method according to claim 19, wherein the ratio of said pigment to said binder is from about 10:1 to about 1:4.

23. An ink jet printing method according to claim 19, wherein the molecular weight of said water-soluble polyester is from 500 to 500,000.

24. An ink jet printing method according to claim 19, wherein said base is absorbent base paper.

25. An ink jet printing method according to claim 19, wherein the pigment contains basic magnesium carbonate.

26. An ink jet printing method according to claim 25, wherein the basic magnesium carbonate is spherical.

27. An ink jet printing method according to claim 19, wherein said pigment contains silica.

28. An ink jet printing method according to claim 19, wherein said pigment contains hydrotalcite.

29. An ink jet printing method according to claim 19, wherein said pigment contains magnesium silicate.

30. An ink-jet printing method, comprising the steps of:

providing a recording medium comprising a lower ink receiving layer disposed on a surface of base and an upper ink receiving layer disposed on said lower ink receiving layer, at least one of said upper and lower ink receiving layers comprising at least one pigment and at least one binder, wherein at least one of said binder is a water-soluble polyester, and an amount of the water-soluble polyester is 40 wt % or more with respect to the total weight of said binder; and performing printing on the recording medium by discharging ink droplets from an orifice of an ink jet recording head in accordance with recording signals.

31. An ink jet printing method according to claim 30, wherein said water-soluble polyester is selected from the group consisting of an anionic water-soluble polyester, a nonionic water-soluble polyester, and mixtures thereof.

32. An ink jet printing method according to claim 30, wherein the ratio of said pigment to said binder is from about 10:1 to about 1:4.

33. An ink jet printing method according to claim 30, wherein the molecular weight of said water-soluble polyester is from 500 to 500,000.

34. An ink jet printing method according to claim 30, wherein the pigment contains basic magnesium carbonate.

35. An ink jet printing method according to claim 34, wherein the basic magnesium carbonate is spherical.

* * * * *

UNITED STATES PATENT AND TRADEMARK OFFICE

CERTIFICATE OF CORRECTION

PATENT NO. : 5,561,454 Page 1 of 3
DATED : October 1, 1996
INVENTOR(S) : YUTAKA KURABAYASHI, ET AL.

It is certified that error appears in the above-indentified patent and that said Letters Patent is hereby corrected as shown below:

COLUMN 1:

Line 42, "an" should read --a--.

COLUMN 2:

Line 24, "deteriorates." should read --deteriorate.--.

COLUMN 5:

Line 21, "be-used." should read --be used.--.

COLUMN 7:

Line 9, delete "lower" (first occurrence); and
Line 19, "specified. Reference" should read --specified. ¶Reference--.

CERTIFICATE OF CORRECTION

PATENT NO. : 5,561,454

DATED : October 1, 1996

INVENTOR(S) : YUTAKA KURABAYASHI, ET AL.

It is certified that error appears in the above-indentified patent and that said Letters Patent is hereby corrected as shown below:

COLUMN 8:

Line 23, "acid, mole" should read --acid, 15 mole--;
Line 44,
"BET specific surface area: 140 m²/g 20 parts"
should read
--BET specific surface area: 140 m²/g --;
Line 45,
"Binder (polyvinyl alcohol, PVA 217, manfuactured by "
should read
--Binder (polyvinyl alcohol, PVA 217, manufactured by
20 parts--;
Line 59, "aaent" should read --agent--; and
Line 66, "110°" should read --110°--.

COLUMN 9:

Line 16, "Example" should read --Examples--.

UNITED STATES PATENT AND TRADEMARK OFFICE

CERTIFICATE OF CORRECTION

PATENT NO. : 5,561,454

DATED : October 1, 1996

INVENTOR(S) : YUTAKA KURABAYASHI, ET AL.

It is certified that error appears in the above-indentified patent and that said Letters Patent is hereby corrected as shown below:

COLUMN 11:

Line 23, "was" should read --and M), was--.

COLUMN 12:

Line 51, "base" should read --a base--.

COLUMN 14:

Line 7, "base" should read --a base--.

Signed and Sealed this

Twenty-second Day of April, 1997

Attest:

BRUCE LEHMAN

*Attesting Officer*

*Commissioner of Patents and Trademarks*